United States Patent [19]

Holt

[11] 4,434,551

[45] Mar. 6, 1984

[54] CONDUCTOR TERMINATION APPARATUS

[75] Inventor: Harley R. Holt, Forest Park, Ill.

[73] Assignee: Allied Corporation, Morris Township, Morris County, N.J.

[21] Appl. No.: 237,192

[22] Filed: Feb. 23, 1981

Related U.S. Application Data

[63] Continuation-in-part of Ser. No. 232,928, Feb. 9, 1981, abandoned.

[51] Int. Cl.3 ........................ H01R 43/04; B23P 19/00

[52] U.S. Cl. ........................................ 29/861; 29/749

[58] Field of Search ................. 29/857, 861, 863, 749, 29/753, 759

[56] References Cited

U.S. PATENT DOCUMENTS

| | | | |
|---|---|---|---|
| 3,803,695 | 4/1974 | Tucci | 29/749 X |
| 3,886,641 | 6/1975 | Davis | 29/749 X |
| 3,965,558 | 6/1976 | McKee . | |
| 3,967,356 | 7/1976 | Holt . | |
| 3,995,358 | 12/1976 | Long et al. | 29/749 X |
| 4,014,087 | 3/1977 | Cover et al. | 29/749 X |
| 4,048,711 | 9/1977 | Haller . | |
| 4,210,997 | 7/1980 | Holt . | |

*Primary Examiner*—Howard N. Goldberg
*Assistant Examiner*—Carl J. Arbes
*Attorney, Agent, or Firm*—James P. DeClercq; Roger H. Criss

[57] ABSTRACT

An apparatus and method for terminating insulated conductors in insulation-piercing contacts mounted in a connector body utilizing independently movable carriage and conductor retention means operating between separated loading and termination stations.

37 Claims, 32 Drawing Figures

FIG. 7
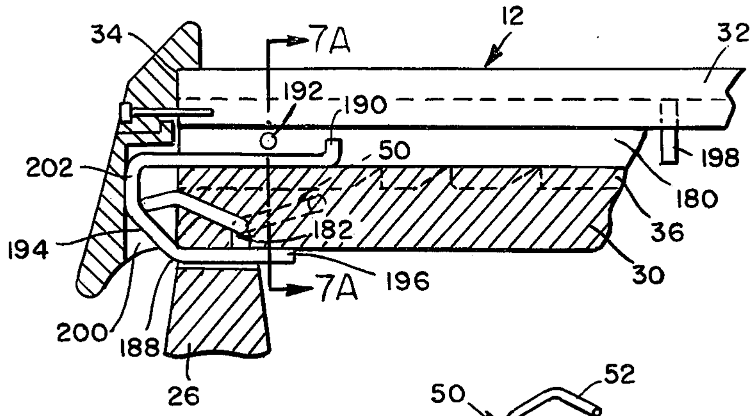
FIG. 7A
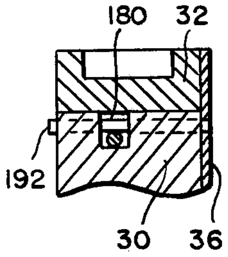
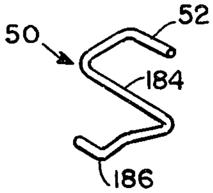
FIG. 7B
FIG. 6
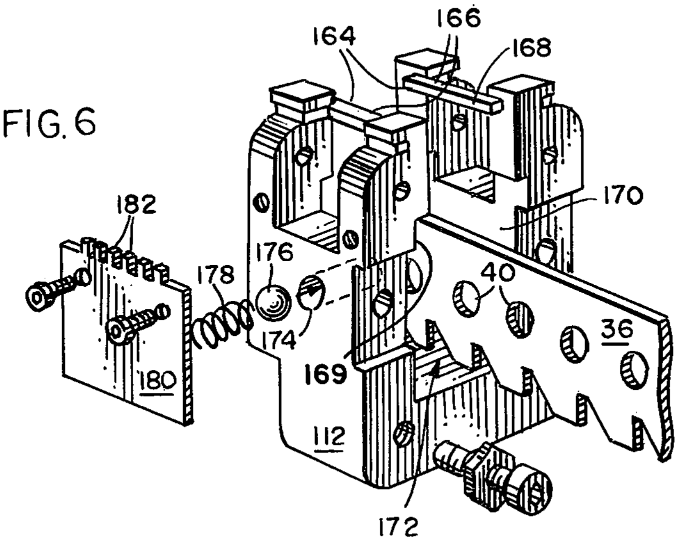

CONDUCTOR TERMINATION APPARATUS

RELATED APPLICATIONS

This is a continuation-in-part of Ser. No. 232,928 filed Feb. 9, 1981, now abandoned.

RELATED PATENTS

Reference is made to the present inventor's U.S. Pat. No. 4,210,997, assigned to Bunker Ramo Corporation, the assignee of the present application.

BACKGROUND OF THE INVENTION

This invention relates generally to apparatus and method for terminating a multiconductor cable to an electrical connector and, more particularly, to a compact, manually operated, portable tool for terminating the insulated conductors of a multiconductor cable to the insulation-piercing contacts of a multicontact connector.

Multicontact electrical connectors are commonly used in communications, instrumentation, data processing, avionics, and other fields to interconnect numerous circuits, often in very confined areas. These connectors are used, for example, in high density rack-and-panel, cable-to-panel and cable-to-cable applications because they provide a multiplicity of precisely aligned miniature contacts in a compact connector body designed for straightforward and reliable mating.

One type of multicontact electrical connector widely employed in the telecommunications field is exemplified by Bunker Ramo Corporation's 57 Series connector. This connector features a plurality of miniature contacts precisely aligned in closely spaced vertical channels along the elongated parallel edges of a dielectric insert. Each of the contacts has an exposed insulation-piercing termination portion having one or more notches with opposed edges for cutting through the conductor insulation to produce a solderless electrical connection to a corresponding one of the insulated conductors. Since the telephone industry generally employs a standard jacketed cable having twenty-five color-coded pairs of insulated conductors in five standard color subgroupings, a most popular form of this connector has twenty-five pairs of contacts spaced along the elongated edges of the connector dielectric, the contacts of each pair being on opposite edges of the dielectric. In wiring the connector, the twenty-five pairs of conductors are carefully sorted and terminated to the connector contacts in a standarized deployment according to color.

Typically, the connectors are initially wired in the factory, usually with semiautomatic termination equipment engineered for rapid, heavy-duty usage in continuous assembly line operations. These machines may include, for example, fixed guide combs between which the connector is positioned, the individual conductors being received and held initially in the guide combs in alignment with the corresponding connector-mounted contacts, and a ram mechanism having punches which slide between the combs to laterally insert the conductors into the insulation-piercing termination portions and terminate the conductors in the contacts. AC electrical power is usually required, and hydraulic or pneumatic drives may be used, requiring oil or water reservoirs or compressed air lines. Semiautomatic termination equipment is therefore generally complex, bulky, and expensive.

One particularly successful semiautomatic termination apparatus is described in the present inventor's U.S. Pat. No. 3,967,356. This apparatus supports the multicontact connector in a stationary position, and conductor spacing and dressing combs are fixed alongside the connector to align the conductors with the appropriate contacts prior to termination. A carriage carries insertion heads along the connector support to predetermined positions where conductor insertion operations are performed on groups of conductors. Movement of the carriage and operation of the insertion heads are pneumatically controlled. While the design and operation of this apparatus is well-suited for its intended purpose of rapid and reliable assembly line wiring of multiconductor connectors, it is not physically or economically practical to carry such apparatus into the field to meet occasional wiring needs.

Yet, after installation, field replacement of these multicontact connectors may be required for a number of reasons. Repair people are therefore sometimes called upon to wire a multiconductor connector in the field, often within the narrow confines of a repair van or telephone equipment closet where support systems such as AC power and/or compressed air lines are not likely to be available. The use of semiautomatic termination equipment in such applications is not feasible due not only to space and support system limitations, but due as well to the economic impracticablity of equipping repair personnel with large, expensive termination machines.

Thus, there exists a specific need for an inexpensive, portable and compact termination apparatus suitable for use by repair people who are occasionally called upon to wire a multicontact connector in the field. While semiautomatic termination machines are not well-suited to meet these needs, manually operated termination devices heretofore available in the marketplace or suggested in the prior art have also been, for the most part, unduly expensive, bulky, and oftentimes too complicated for efficient reliable operation by the occasional unskilled user. In addition, these devices typically require considerable room for operation, room which might not be conveniently available in field wiring situations.

Among the design concepts employed in prior manually operated termination devices is that shown in U.S. Pat. No. 3,965,558. The termination machine described therein includes a wire-positioning comb and a retention spring which initially align and hold the insulated wires and a clamp which holds the wires in position as the wires are trimmed to length. Once trimming is completed, the spring and comb are moved away from the wires, and the connector is simultaneously moved into position with the row of contacts on one side of the connector in alignment with the clamped wires. A ram unit accompanies the connector as it is moved into this position so that the ram blades can be driven against the entire group of wires to terminate them in their respective contacts. A manually operated cam and lever mechanism provides the driving force to the ram blades. It is noteworthy that this machine requires full-sized spring, comb, clamp and ram components to effect wiring of one entire side of the connector. This, of course, results in a correspondingly large machine which requires two separate operations to wire both sides of the connector. Furthermore, in order to produce the termination force required to properly and uniformly seat all of the wires on one side of the connector in their respective contacts, a cam and lever mechanism having a relatively long handle which operates in a broad arc is provided. This mechanism requires considerable operating clearance, rendering the machine ill-suited to operation in confined areas.

A somewhat different approach to manual termination of conductors to a multicontact connector is illustrated in U.S. Pat. No. 4,048,711. There, the apparatus includes a fixed connector holder with guide combs positioned along either side of the connector, each guide comb being full-sized to accomodate all of the conductors to be terminated to the contacts along the corresponding side of the connector. Ram blocks carrying a like number of rams are carried by ram arms having force amplification arms. Operation of the apparatus proceeds by laterally moving the guide combs out of the way of the connector holder, mounting the connector in place and returning the combs to their loading position whereupon the conductors are dressed into the comb interstices. The ram arms are then pivoted to a closed position to laterally force the conductors into their corresponding contacts. Relatively complex alignment and fulcrum structures are provided to properly align the rams with the contacts and to insure parallel movement of the rams at the termination end of their arc of movement. Also, as in the case of the previously mentioned apparatus, this apparatus utilizes full-sized combs and ram blocks, both corresponding in size and capacity to the number of contacts mounted in the connector, as well as force amplification arms operating in a broad arc and requiring considerable clearance. Such an arrangement again results in a bulky tool requiring the careful application of considerable termination force to insure that the numerous conductors being handled at one time are properly seated in their respective contacts.

Thus, the need for an inexpensive, portable and compact termination apparatus suitable for use in wiring multicontact connectors in the field has not been satisfied by prior art termination tools, and the need for a relatively inexpensive conductor termination apparatus suitable for operation in the field remains.

SUMMARY OF THE INVENTION

It is therefore an object of the present invention to provide a relatively inexpensive, manually operable, portable conductor termination apparatus suitable for operation in confined areas.

Yet another object of the present invention is to provide conductor termination apparatus which produces reliable terminations without requiring the application of large termination forces.

In accordance with these and other objects and advantages of the present invention which will become apparent upon reading the following detailed description, the present invention comprises a compact, low cost, portable apparatus for terminating a plurality of conductors to a corresponding plurality of contacts mounted in predetermined alignment in a connector body. More particularly, the present invention is directed to an apparatus in which movable connector carriage means and movable conductor retention means cooperate with conductor terminating means to produce a termination apparatus featuring the compactness, low cost and portability required for wiring multicontact connectors in the field.

The present termination apparatus comprises a termination station with means for effecting termination of a plurality of conductors to the contacts of a multicontact connector and, removed from the termination station, a loading station for facilitating manual positioning of the conductors for termination to the contacts. The connector body is supported on carriage means which are movable with respect to the terminating means for aligning the contacts of the connector in relation thereto. The apparatus further includes retention means for receiving the conductors at the loading station and for holding them in position during the termination operation, the retention means being movable between the loading station and the termination station and movable, as well, with respect to the connector body to align the conductors with their respective contacts.

In a preferred embodiment of the invention, the conductors are terminated to the connectors in groups. In particular, the retention means and the carriage means are movable in unison from the loading station to the termination station where termination of a group of conductors carried by the retention means is effected. Thereafter, the retention means are returned to the loading station opposite the next group of contacts so that the next group of conductors may be dressed into the retention means and the retention means and the carriage means again moved into the termination station for termination of this second group of conductors.

The carriage means are preferably indexible relative to the terminating means to sequentially advance the connector body in relation to the terminating means until conductors have been terminated to all of the contacts carried by the connector body. The retention means, in turn, are preferably indexible relative to the carriage means for aligning succeeding groups of conductors opposite their corresponding groups of contacts.

In a further preferred embodiment of the invention the apparatus includes a return mechanism for automatically returning the carriage and retention means from the termination station to the loading station. The relative travel of the automatically returning carriage means and retention means in this embodiment of the invention is preferably indexed in the manner described in the preceeding paragraph.

The above described apparatus thus utilizes unique concepts of relative movement between carriage means, retention means and termination means to create a novel apparatus in which compact retention and termination components play a key role. This novel termination apparatus is compact in size and operation, simple to construct and use, and inexpensive.

BRIEF DESCRIPTION OF THE DRAWINGS

The features of this invention which are believed to be novel and unobvious are set forth with particularity in the appended claims. The invention, together with its objects and advantages, may be best understood by reference to the following description taken in conjunction with the accompanying drawings in which like reference numerals identify like elements in the several figures and in which:

FIG. 6 is an exploded perspective view illustrating a ball detent latching mechanism for positioning the retention means along the carriage means;

FIG. 7 is a sectional view of the carriage means and a carriage latching mechanism;

FIG. 7A is a partial end view of the structure shown in FIG. 7;

FIG. 7B is a perspective view of an indexing dog utilized in the carriage latching mechanism of FIG. 7;

FIGS. 8A'–8E' are partial elevational views of the ball detent and carriage latching mechanisms illustrating their respective operations in relation to the positions of the retention, carriage and termination means depicted in FIGS. 8A–8E;

DESCRIPTION OF THE PREFERRED EMBODIMENT

Figure 1:
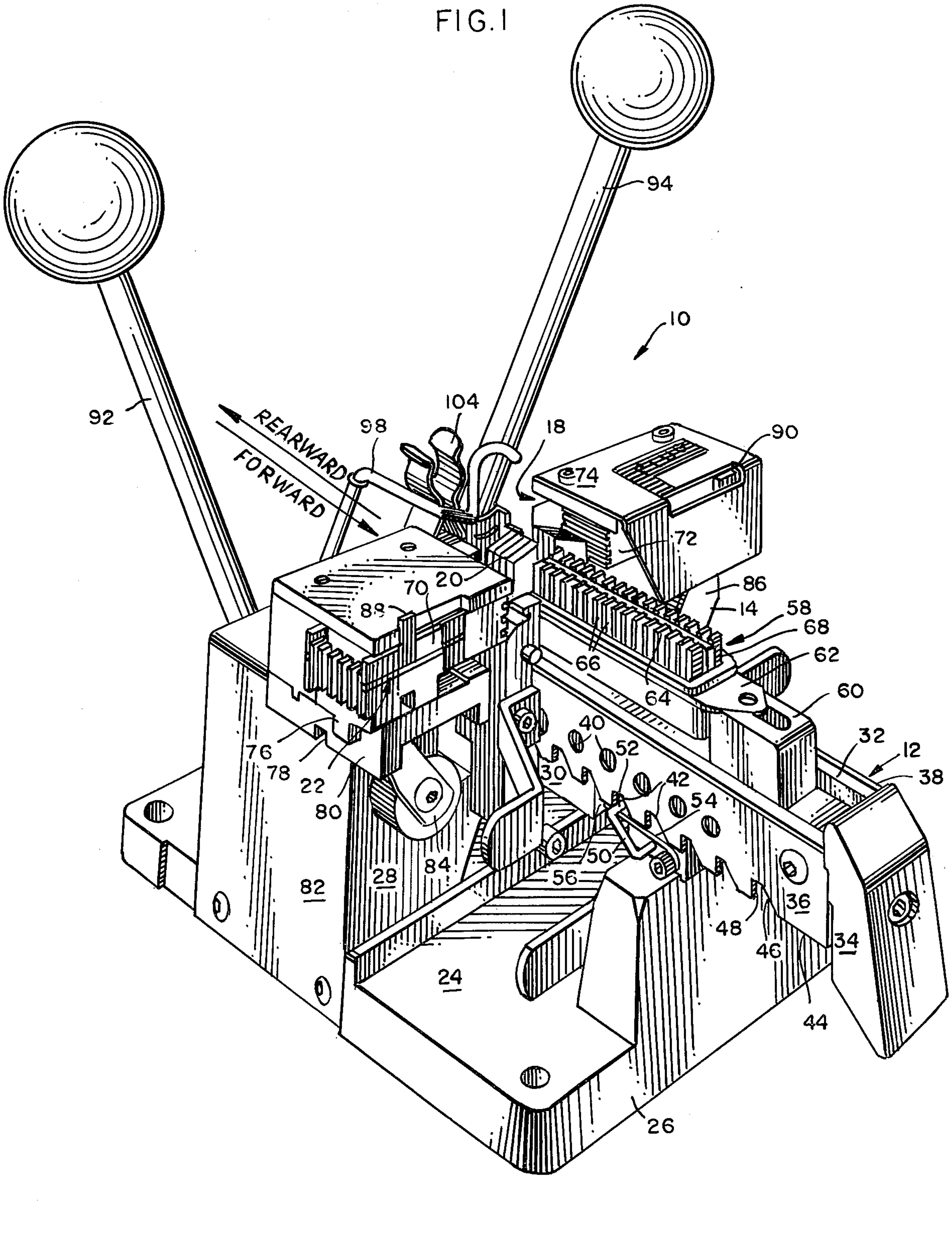
FIG. 1 is a perspective view illustrating a preferred embodiment of the apparatus of the invention as seen from a forward vantage point occupied by an operator.

Turning now to FIGS. 1–4 for an overview of the operation of the invention, there is shown a conductor termination apparatus 10 with a carriage 12 supporting a connector body 14 for movement between a loading station 16 and a termination station 18. Retention means 20 are supported within the apparatus, again for movement between the loading and terminating station.

In the preferred embodiment of the invention as illustrated in FIGS. 1–8, a first group of conductors are dressed into the retention means at the loading station and the retention means and carriage are moved in unison from the loading station to the termination station for termination of that first group of conductors to their corresponding contacts in the connector body. The retention means are then returned to the loading station independently of the carriage and indexed in place opposite the second group of contacts in the connector body. A corresponding second group of conductors are dressed into the retention means and the retention means and carriage are again moved in unison to the termination station where termination of this second group of conductors is effected. Termination of conductors to all of the contacts of the connector is accomplished by indexing the carriage relative to the terminating means with each termination operation to sequentially advance the connector body in relation to the terminating means.

In order to wire a multicontact connector, carriage 12 is moved to its rearwardmost position (to the left in FIGS. 1–4), and retention means 20 is moved forward (to the right in FIGS. 1–4) to loading station 16 to provide clearance so that the connector can be mounted in its appropriate position on the carriage. With the connector in place, the carriage is moved forward to bring the rearwardmost portion of the connector into position opposite the retention means at the loading station. The appropriate group of conductors is then chosen by the operator and dressed into the retention means in alignment with the corresponding group of contacts carried by the rearwardmost portion of the connector.

Retention means 20 are then moved to the rear in unison with the carriage bringing both the retention means and the rearwardmost portion of the connector into termination station 18. Terminating means are operated to terminate the first group of conductors to their corresponding group of contacts and the retention means are returned forwardly along the carriage means to the next group of conductors which are waiting at the loading station. The next group of conductors are dressed into the retention means and the above procedure is repeated. Succeeding groups of conductors are terminated in this manner until all of the contacts of the connector have been wired, whereupon the connector is removed from the apparatus.

Figure 2:
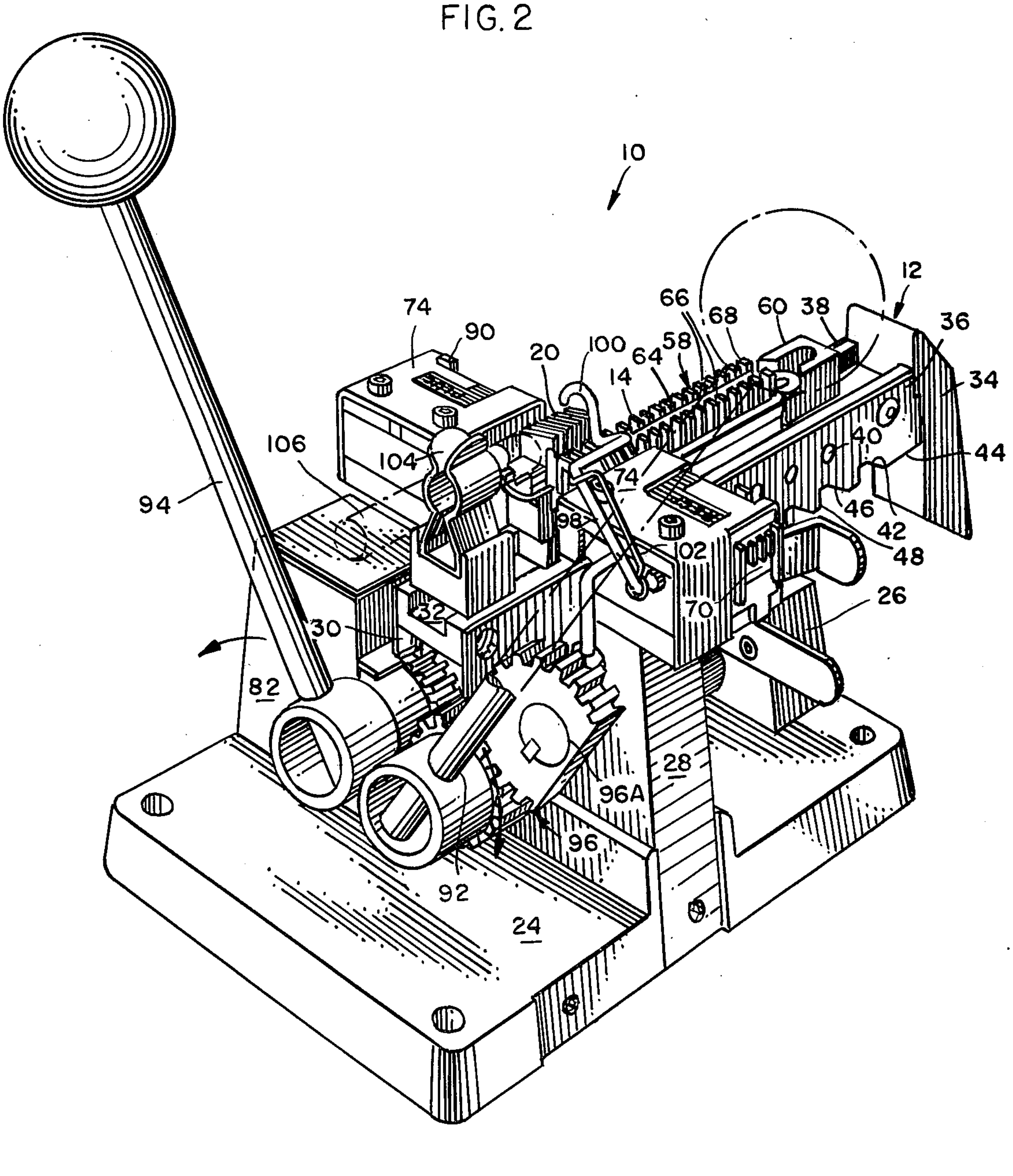
FIG. 2 is a perspective view of the apparatus shown in FIG. 1 as seen from a rearward vantage point.

Turning to FIGS. 1 and 2 for a more detailed discussion of the invention, there is shown a conductor termination apparatus 10 with base 24 having a forward pedestal 26 which rests before the operator during operation of the apparatus and a rearward pedestal 28. Base 24 includes holes at its four corners for optionally securing the apparatus to a support surface. A rectangular slide bar 30 is attached to the forward and rearward pedestals and bridges the gap therebetween.

Carriage 12 includes a platform 32 slidably positioned on slide bar 30 with a push-pull pad 34 attached thereto at the forward end of the carriage. The push-pull pad is grasped by the operator to conveniently move the carriage longitudinally along the slide bar. The carriage is laterally confined on the slide bar between an index plate 36 and a back-up plate 38 attached to the sides of the platform and projecting downwardly therefrom to abut opposite vertical sides of the slide bar.

Index plate 36 serves not only to laterally confine the carriage but also to index carriage and retention means latching mechanisms which control the relative movement of the carriage and retention means during the operation of the apparatus. Thus, index plate 36 has a series of roll holes 40 medially positioned along the plate which form part of the retention means latching mechanism and a corresponding series of index notches 42 evenly spaced along the bottom edge 44 of the plate which form part of the carriage latching mechanism. Each notch 42 has an oblique cam edge 46 and a generally perpendicular stop edge 48.

An indexing dog 50 rotatably mounted to slide bar 30 for engagement with index notches 42 is another component of the carriage latching mechanism. The indexing dog includes a catch 52 which is biased into engagement with the notches by a spring 54. Catch 52 of the indexing dog is designed to move within a clearance groove 56 of the slide bar. The catch thus rides up along cam edges 46 of the index notches to permit the carriage to move to the rear without interference while resisting forward movement of the carriage by engaging stop edges 48. Further details of the operation of the latching mechanisms will be discussed below in connection with FIGS. 6 and 7.

Figure 12:
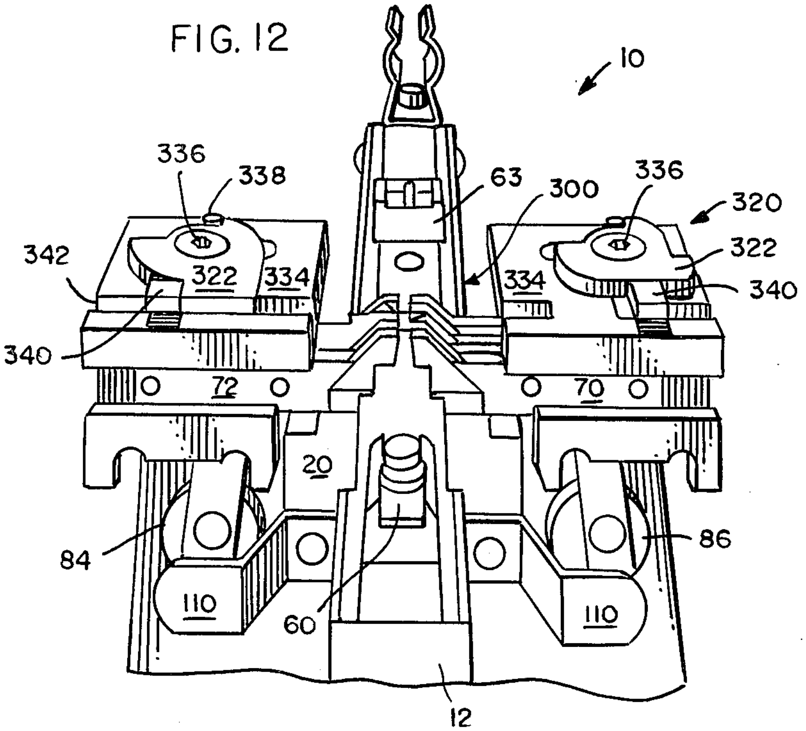
FIG. 12 is a perspective view of a portion of the structure illustrated in FIG. 9, particularly illustrating a wire hold-down mechanism and a lateral stop element.
Figure 14A:
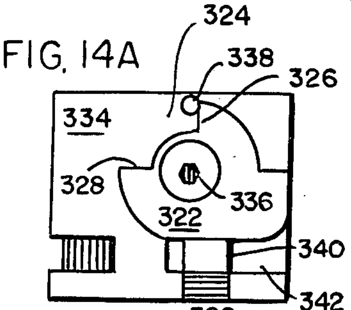
FIGS. 14A–14B are plan views of the lateral stop assembly of the FIG. 9 structure in its two alternative positions.
Figure 14B:
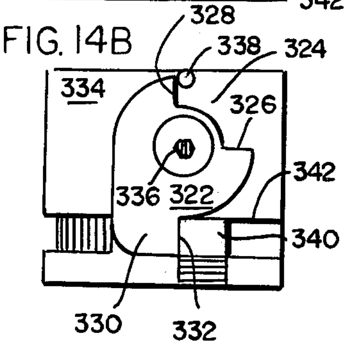
Figure 12A:
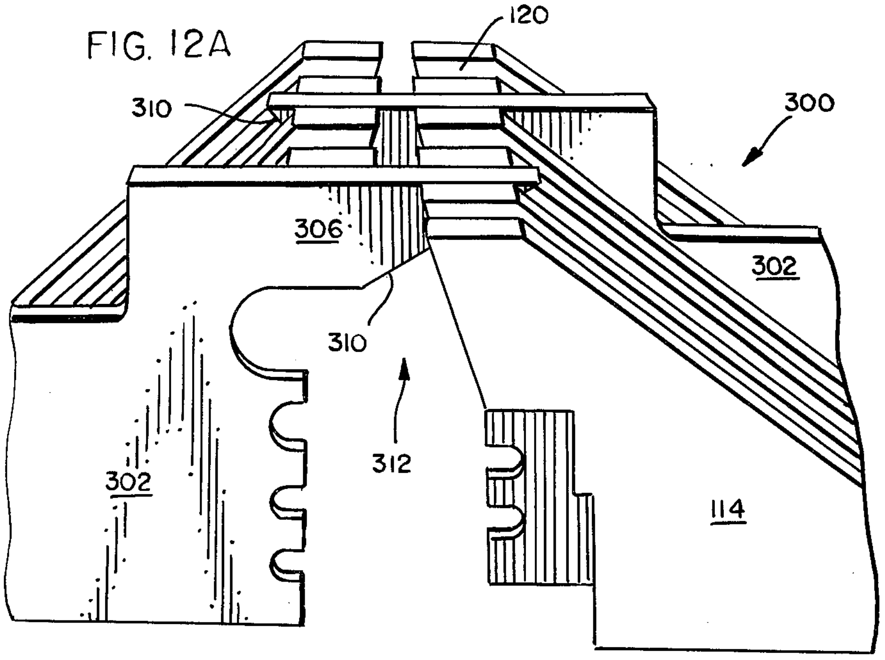
FIG. 12A is an enlarged perspective view of the wire hold-down mechanism of FIG. 12.
Figure 13:
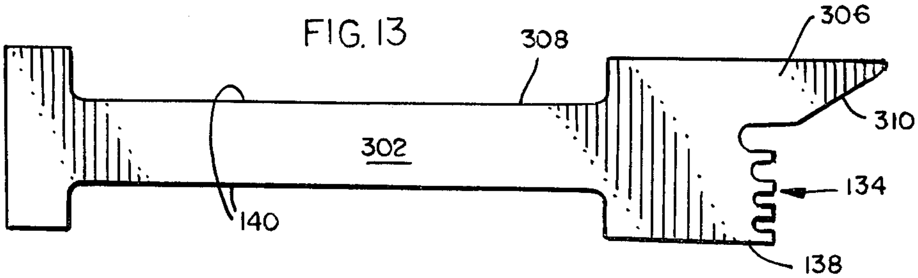
FIG. 13 is an enlarged elevation view of a punch which has been specially configured to perform a wire hold-down function.

A connector nest 58 is attached to the top surface of platform 32 for supporting connector body 14. The connector nest comprises a forward shoe 60 and a complementary rearward shoe 63 (FIG. 12) both spaced and configured to accept flanges 62 protruding from the connector body.

Although the particular connector illustrated is Bunker Ramo Corporation's twenty-five pair 57 Series telephone connector, multicontact connectors with varying numbers of contacts and differing structural details could be wired in an apparatus constructed in accordance with the teaching of the present invention. In the present figures, connector body 14 has a brass shell in which an elongated dielectric 64 is disposed. Dielectric 64 in turn has a series of twenty-five pairs of precisely aligned closely spaced vertical channels 66 along either elongated edge 68 of the connector. Miniature electrical contacts (not shown) mounted in these vertical channels include insulation-piercing termination portions of conventional design. The lateral spacing between channels 66 and therefore, between the contacts mounted therein is uniform for a particular connector but may vary between different connector types, requiring varying lateral throw in termination mechanisms. Thus, for example, 57 SERIES plug connectors have a narrower lateral spacing between the channels than do 57 SERIES receptacle connectors.

Terminating means in the form of punch assemblies 70 and 72 are located at termination station 18 on either side of the path of movement of the carriage. Although the punch assemblies are shielded in the fully assembled apparatus by punch assembly covers 74, the cover shielding punch assembly 70 has been removed in FIG. 1 to illustrate the mounting of the assembly. It may thus been seen that assembly 70 has a longitudinal rail 76 which rests within a complementary longitudinal groove 78 in a bottom slipper 80 fixed to pedestal 28. Movement of the punch assembly, which is linear and perpendicular to the longitudinal path of movement of the carriage, is controlled through an actuating means including a gear train, shielded from view by gear covers 82 on either side of the apparatus, which operates bell cranks 84 and 86.

Indicator tabs 88 and 90 are attached to the punch assemblies for indicating the lateral position of the assemblies relative to the lateral spacing between contact pairs of the connector. "PLUG" and "RECP" markings are applied to punch assembly covers 74 opposite the path of movement of the tabs for positively indicating the lateral positions of the punch assemblies corresponding to the differing lateral spacings of 57 SERIES plug and receptacle connectors.

Further details of the punch assembly actuating means are illustrated by removal of the starboard gear cover (lower right in FIG. 2). Control arms 92 and 94 are seen in this view, mounted to gear train 96 which transforms the downward arcuate movement of the control arms into arcuate inward motion of bell cranks 84 and 86 which, in turn, move the punch assemblies linearly across the path of the carriage. Return of the control arms to their initial positions, as depicted in FIG. 2, retracts the punch assemblies by reversing the motion of the gear train and bell cranks.

Under certain conditions of conductor tension and other termination apparatus operating parameters, conductors may pop out of their desired position during the termination operation producing a termination which may fail to satisfy specifications. Although the present apparatus does not generally suffer this problem, an optional wire hold-down 98 has been provided in the present embodiment as a back-up.

Hold-down 98, which is attached to a forward flange on gear wheel 96A, includes a hook portion 100 which clamps down upon each group of conductors just back of the rearward edge of the punch assembly to prevent the conductors from popping out of position as they are trimmed and inserted into their respective contacts. The operation of the hold-down is coordinated with the movement of the control arms so that the hold-down is normally at rest in a location clear of the conductors under the bias of spring 102, thus avoiding undesirable interference with the handling of the conductors and the movement of the carriage. Finally, a cable clip 104 is mounted to the rear of the carriage for holding a multi-conductor cable 106 in a convenient orientation with respect to the connector and the hold-down during operation of the apparatus.

Figure 3:
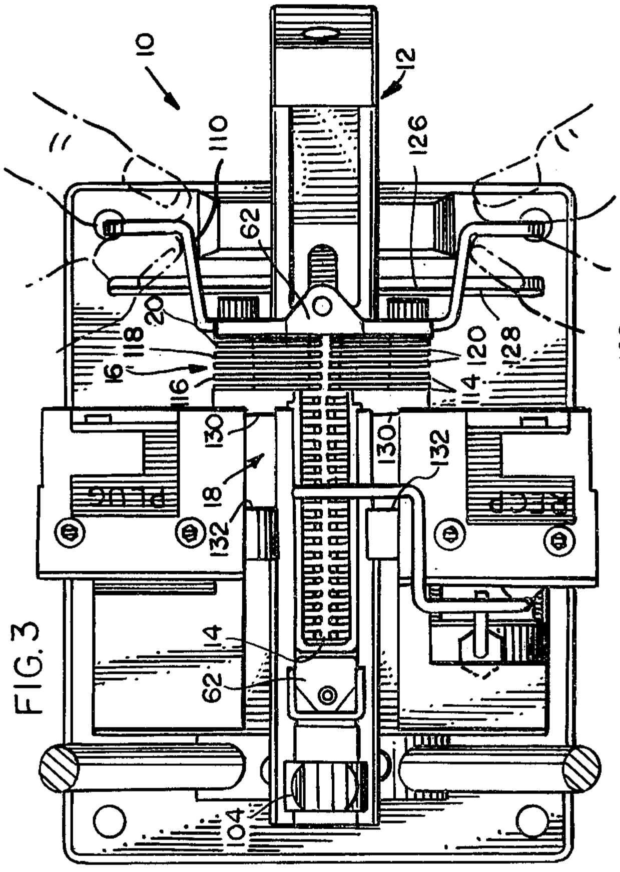
FIG. 3 is a top plan view of the apparatus shown in FIG. 1 in which the retention means has been advanced along the connector body to the last group of contacts to be wired.
Figure 4:
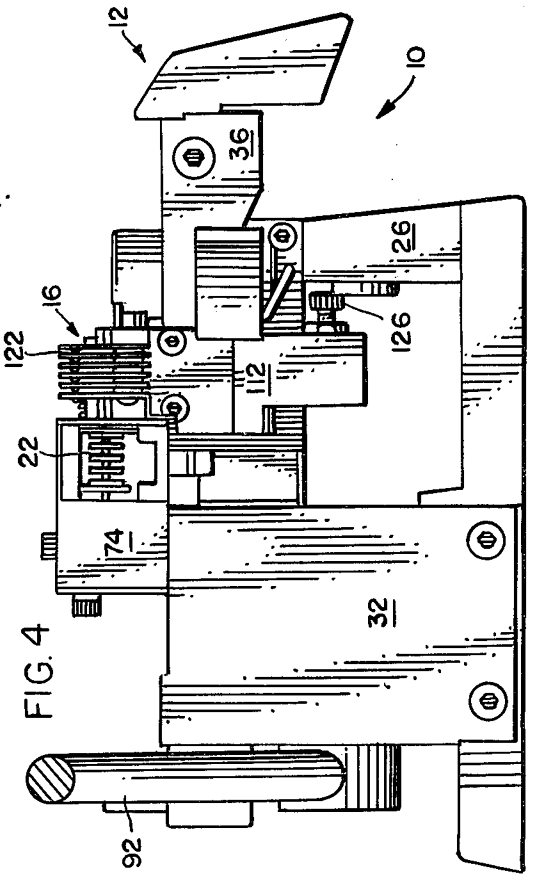
FIG. 4 is a side elevational view of the apparatus shown in FIG. 3.

Turning now to FIGS. 3 and 4, push bracket 110 of retention means 20 is shown as the retention means is being pushed to the rear (to the left in FIGS. 3 and 4) to bring the last group of contacts into position opposite the punch assembly at the termination station. The operator's fingers conveniently grasp the push bracket in the manner illustrated for longitudinal movement between termination station 18 and loading station 16. Although the retention means 20 carry a group of conductors at this point in the operation of the apparatus, the conductors have been deleted from this view to improve its clarity.

Retention means 20 comprise a comb frame 112 which supports opposite groups of comb teeth 114 and 116 longitudinally spaced from each other to define respective groups of conductor receiving pockets 118 and 120 into which conductors may be dressed and retained. The comb teeth are independently stamped and have small dimples 122 on their faces which capture the conductors within the pockets to insure proper positioning during termination. A more detailed description of this comb structure may be found in U.S. Pat. No. 4,210,997.

One piece combs with varying retention features may be used in lieu of the independently mounted comb teeth described above. In some applications the conductor capturing feature of the combs may be dispensed with altogether leaving the combs to act merely as conductor positioning means. For example, the conductor capturing feature of the combs will not be required where the connector being wired has integral conductor capturing means of its own.

As noted earlier, connector 14 has twenty-five pairs of contacts corresponding to the telephone industry's standard jacketed cable. Opposite groups of six comb teeth are employed in the present embodiment of the invention to define five conductor receiving pockets on each side of the path of travel of the carriage. These five pockets are chosen to permit the five major color groupings of five pairs of conductors each of the telephone cable to be sequentially loaded into retention means 20 and terminated into their respective five groups of five contact pairs.

With final reference to FIGS. 3 and 4, there are illustrated means for limiting the forward and rearward movement of retention means 20. An adjustable stop 126 limits forward movement as it intersects bar 128 when the retention means reaches its forwardmost position in the loading station. The adjustability of stop 126 is an optional feature of the invention used to insure proper alignment of the retention means with the roll holes of the index plate. The rearward edge 130 of the retention means in turn, limits rearward motion of the retention means as it intersects rearward stop 132 at the termination station thus aligning the retention means with the punch assembly.

Figure 5:
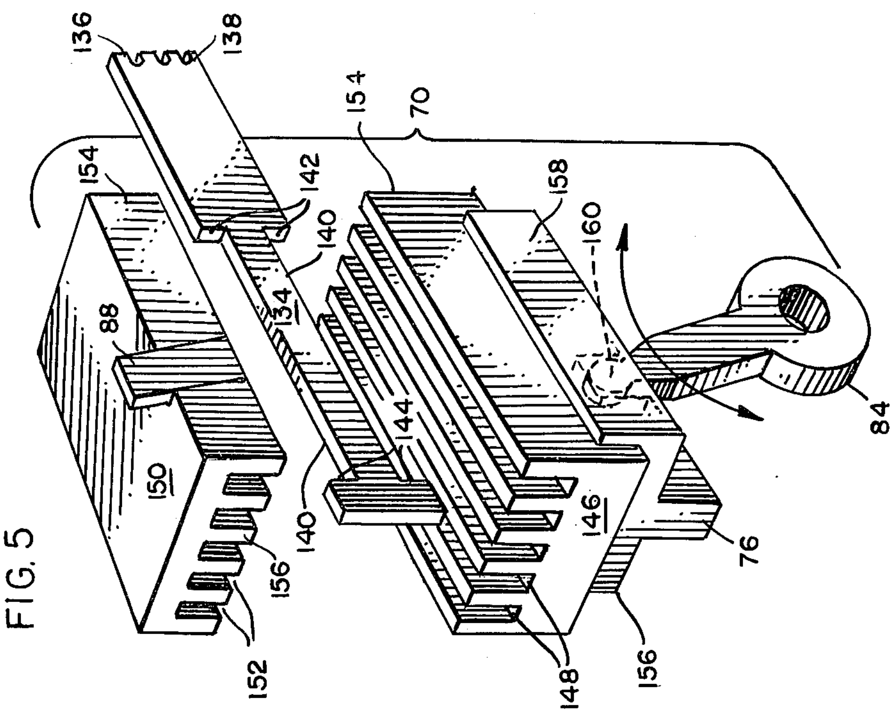
FIG. 5 is an exploded perspective view of a punch assembly of the terminating means.

The termination means of the apparatus are illustrated in FIG. 5 in which a representative punch 134 is shown in juxtaposition to partially disassembled punch assembly 70. Punch 134 is configured along its forward edge 136 in a manner well-known in the art to properly engage the specific dimensions and geometric configuration of the termination portions of insulation-piercing contacts. The punch includes a bottom shearing edge 138 for trimming the conductor immediately prior to insertion into a contact. Punch 134 also includes along its rearward section, mounting cut-outs 140 defining forward and rearward shoulders 142 and 144.

The punch assembly comprises, in addition to punches 134, a base 146 with a series of grooves 148 for receiving a corresponding series of punches 134 and a cover 150 with a corresponding series of grooves 152. The width of grooves 148 and 152 correspond respectively to the width of the punches which rest snugly within the grooves with shoulders 142 and 144 in abutment with the inside and outside edges 154 and 156 of base 146 and cover 150.

Base 146 of the punch assembly is press fitted into a top slipper 158 which has a longitudinal rail 76 that rests within a complementary longitudinal groove 78 in bottom slipper 80 (FIG. 1). This mounting arrangement permits sliding linear movement perpendicular to the path of movement of the carriage. This movement is under the control of the bell cranks which each have rounded noses 160 that pivotably engage a transverse slot 162 in the bottom slipper rails.

Turning now to FIG. 6, comb frame 112 of the retention means is illustrated with combs removed and cut-off knives 164 in position near the top of the comb frame. Top surfaces 166 of knives 164 lie in a plane which meets the plane defined by punch bottom shearing edges 138 (FIG. 5). The top surfaces and shearing edges come into play in the termination operation of the apparatus, when conductors resting within the comb pockets are trapped between knife faces 168 and shearing edges and then trimmed to the desired length as the punches move across the top surfaces of the knives.

Comb frame 112 includes longitudinal tracks 169 and 170 on either side of a central frame cavity 172. These tracks correspond in height to the height of the index and back-up plates to confine the comb frame to longitudinal movement along the carriage, indexed at predetermined points by a detent mechanism carried by the frame which cooperates with the roll holes of the index plate.

This detent mechanism comprises a transverse bore 174 in the comb frame which accepts a ball detent 176 and helical compression spring 178. The detent and spring are confined within bore 174 between a back-up plate 180, bolted to the side of the comb frame, and index plate 36. Back-up plate 180 includes along its upper edge a series of projections 182 which assist in the spacing of the individual comb teeth carried by the frame. The axis of bore 174 is located vertically in the comb frame in alignment with a line defined by the centers of roll holes 40 of the index plate. Each of the roll holes has a diameter smaller than that of ball detent 176. Thus, as the comb frame is moved along the carriage, the ball detent rolls into consecutive roll holes under urging of spring 178 to index the frame at these positions. In the present embodiment of the invention the roll holes are spaced at intervals corresponding to groups of five pairs of contacts to thereby index the retention means for sequential positioning opposite consecutive groups of five contacts carried by a connector mounted on the carriage.

FIGS. 7 and 7A depict a mechanism utilized in the apparatus for disabling the carriage latch mechanism to permit the carriage to be returned to its initial forwardmost position after the wiring of a particular connector is completed. These figures represent a starboard view of the carriage and associated features of the invention in contrast to the port view of the prior figures. Since an understanding of the operation of the dog disable mechanism requires an appreciation of the shape of indexing dog 50, the indexing dog is depicted in a perspective view of FIG. 7B.

Turning now to FIGS. 7 and 7A, carriage 12 is shown with the back-up plate removed from platform 32 and the notched portion of hidden index plate 36 in phantom lines. Platform 32, resting upon slide 30, has a longitudinal slot 180 and a transverse bore 182 in which central portion 184 of indexing dog 50 is rotatably mounted. The indexing dog includes catch 52 which engages the notches of the index plate as well as a downwardly and inwardly directed cam follower 186.

A dog disable cam 188 with upwardly directed finger 190 is slidably mounted in slot 180. Forward movement of the disable cam is limited by a transverse pin 192 extending across slot 180 for engaging finger 190. The dog disable cam further includes an oblique camming portion 194 which engages cam follower 186 during the operation of the disable mechanism. A guide portion 196 confined to movement within a groove in forward pedestal 26 is provided to stabilize the dog disable cam.

A knock-off pin 198 is mounted to the platform of the carriage and extends into slot 180. This pin engages finger 190 of the disable cam as the carriage is moved forward (to the left in FIG. 7) to push the disable cam to its forwardmost position. Finally, push-pull pad 34 has a clearance slot 200 which engages and accommodates a forward portion 202 of the disable cam, as the carriage is moved rearwardly.

Operation of the dog disable mechanism may be understood by picturing the carriage at its forwardmost position with the dog disable cam also in its forwardmost position and finger 190 sandwiched between knock-off pin 198 and transverse pin 192. At this stage in the operation of the apparatus, cam follower 186 is clear of the dog disable cam and the dog is in engagement with the notches of the index plate. As the carriage is moved to the rear, the dog rides up over successive cam edges 46 of the index plate notches until push-pull pad 34 encounters forward portion 202 of the dog disable cam and carries it to the rear as depicted in FIG. 7. During this movement of the dog disable cam, camming portion 194 of the disable cam encounters follower 186 to cam the follower upward and disengage catch 52 from the index plate notches. With the catch disengaged in this manner, the carriage may be moved toward its forwardmost position whereupon knock-off pin 198 encounters and moves the disable cam forward to release dog 50 which once again engages the index plate notches halting further forward movement of the carriage.

The operation of the invention (as depicted in FIGS. 1–7) in wiring a connector can best be understood by referring to schematic FIGS. 8A–8E and 8A′–8E′, with reference back to the earlier figures for clarification of precise structural details of the apparatus.

Figure 8A:
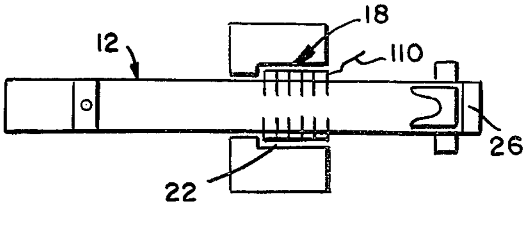
FIGS. 8A–8E are schematic representations of the relative positioning of the retention, carriage and termination means during step-by-step operation of the apparatus.
Figure 8A:
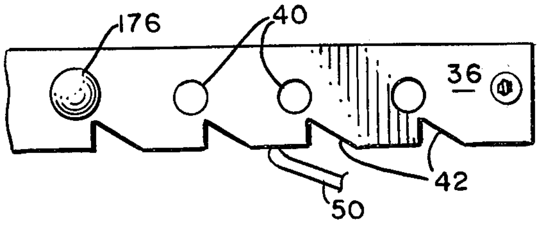

Commencing with an empty termination apparatus in which carriage 12 rests in an intermediate location, the operator applies rearward force to push-pull pad 26 to move the carriage into its most rearward position, carrying retention means 22 into termination station 18, as seen in FIG. 8A. This movement of the carriage causes the dog disable cam to move dog 50 out of engagement with index plate notches 42, as illustrated in FIG. 8A′.

Figure 8B:
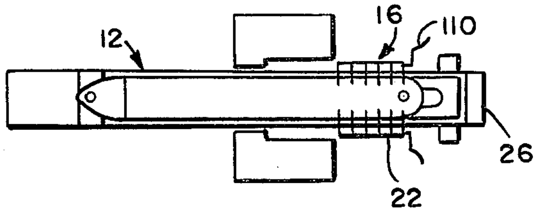
Figure 8B:
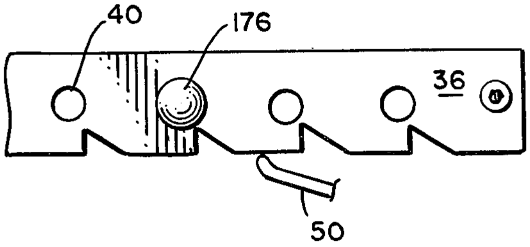

The operator then moves the retention means forward while applying a rearward force to the push-pull pad to keep the carriage (and index plate) in its most rearward position, thus bringing the retention means into loading station 16, as illustrated in FIGS. 8B and 8B′.

Figure 8C:
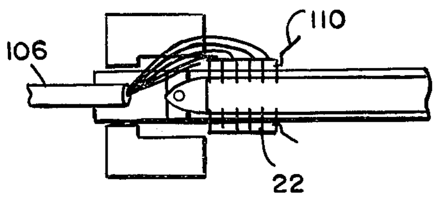
Figure 8C:
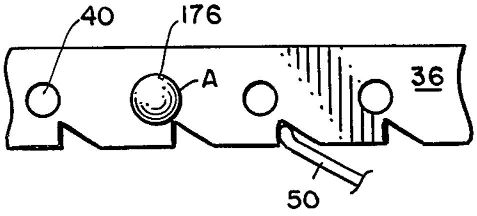

The connector which is to be wired is then loaded onto the nest of the carriage, and multi-conductor cable 106 is positioned in the cable clip, whereupon the operator again grasps the push-pull pad and pulls the carriage all the way forward, as depicted in FIG. 8C. This movement of the carriage releases the dog disable cam so that the dog can engage a notch of the index plate, as depicted in FIG. 8C′ to halt the carriage with the first subgroup of five connector contacts opposite corresponding comb pockets of the retention means. The retention means remains at the loading station during this movement of the carriage while ball detent 176 moves along roll holes 40 and stops in roll hole A (FIG. 8C′). This places the retention means in alignment with the first group of connector contacts. The conductors of the cable are then fanned out and the appropriate five pair of color-coded conductors chosen and dressed down into the corresponding comb pockets, as shown in schematic form for the first five conductors corresponding to the first five contacts along one side of the connector dielectric.

Figure 8D:
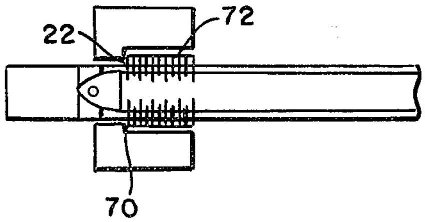
Figure 8D:
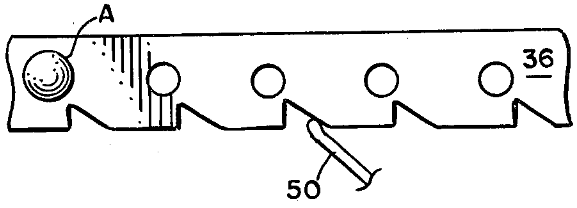

Once the conductors have been dressed down, the retention means are moved back into position in the termination station in unison with the carriage by grasping push bracket 110 of the retention means and moving it to the rear until it stops in the desired position, as shown in FIG. 8D. This advances the index plate in relation to the dog so that the dog moves into the next forward notch and part way up its cam edge (FIG. 8D′). The carriage moves in unison with the retention means due to the engagement between the ball detent and its corresponding roll hole.

The gear train is then operated by moving the control handles downwardly, causing punch assemblies 70 and 72 to move across the cut-off knives trimming the conductors to length and then seating each conductor in its corresponding contact.

Figure 8E:
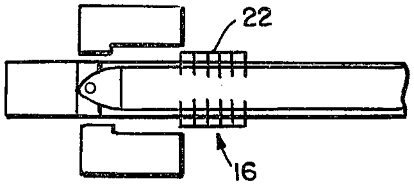
Figure 8E:
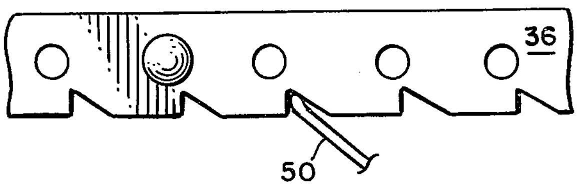

The retention means push bracket is then moved forward as shown in FIG. 8E to carry the carriage forward until the dog engages the stop edge of the notch, whereupon the forward movement of the retention means continues past this point, indexing the ball detent to the next roll hole with the retention means coming to rest in the loading station, opposite the next subgroup of contacts as in FIG. 8E′. The slight forward movement of the carriage described above removes the loading station from the termination station a distance sufficient to insure that loading of conductors into the retention means can proceed without interference from the terminating means.

Succeeding subgroups of five conductors each are chosen and dressed down into the comb pockets and the above sequence of operations repeated until the entire connector has been wired. At this point, the carriage is moved to its forwardmost position and the fully wired connector is removed.

A second preferred embodiment of the invention is illustrated in FIGS. 9–14. This embodiment generally incorporates the features of the earlier FIGURES but includes an automatic return mechanism, an alternative wire hold-down and an adjustable lateral stop assembly, all of which are discussed in detail below.

This embodiment of the invention functions in a somewhat more convenient fashion than that of the earlier embodiment since one step in the operation of the carriage and retention means is performed automatically rather than manually by the operator. As in the earlier device, carriage 12 is moved to its rearwardmost position to the loading station to provide clearance so that the connector can be mounted in its appropriate position on the carriage. With the connector in place, the carriage is moved forward to bring the rearwardmost portion of the connector into position opposite the retention means at the loading station. The appropriate group of conductors is then chosen by the operator and dressed into the retention means in alignment with the corresponding group of contacts carried by the rearwardmost portion of the connector.

Retention means 20 are then moved to the rear in unison with the carriage bringing both the retention means and the rearwardmost portion of the connector into the termination station. This rearward movement of the retention means loads a return spring and arms a latch assembly which comprise an automatic return mechanism 200. The terminating means are then advanced from their rest position to a termination position to terminate the first group of conductors to their corresponding group of contacts. As the terminating means are returned to their rest position, the latch assembly is released to automatically move the retention means and the carriage from the termination station to the loading station while advancing the retention means along the carriage means to the next group of contacts. Succeeding groups of conductors are dressed into the retention means and the above procedure is repeated until all of the contacts of the connector have been wired, whereupon the connector is removed from the apparatus.

Figure 9:
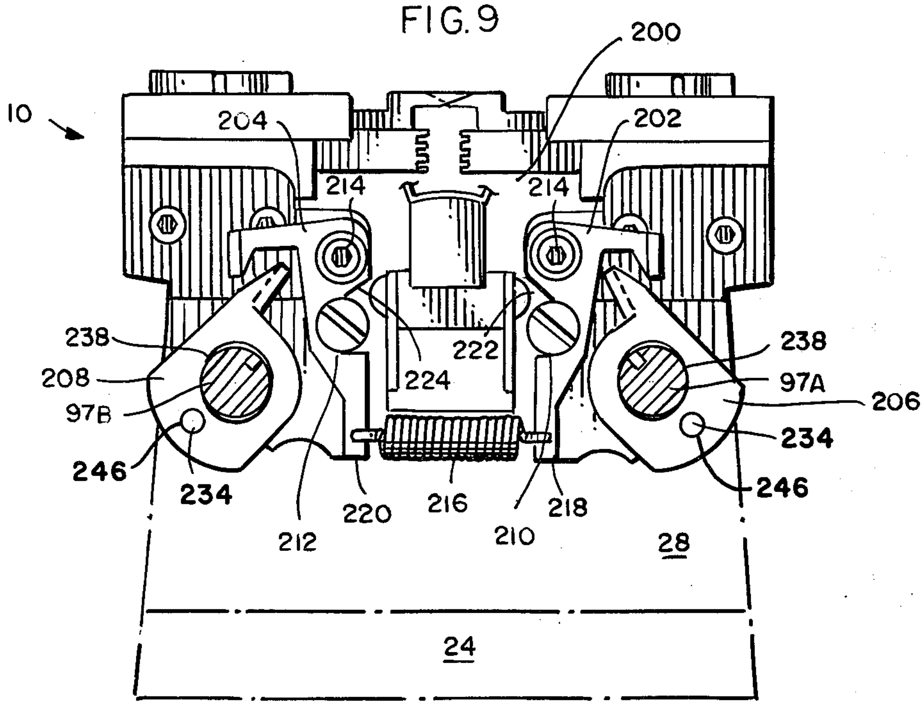
FIG. 9 is an elevational view of a second preferred embodiment of the invention as seen from a rearward vantage point, in which the control arms and gear train have been removed to better expose an automatic return mechanism.

Turning first to FIG. 9 for a more detailed description of automatic return mechanism 200, there is shown, from a rearward vantage point, a conductor termination apparatus 10, in which the control arms and gear train have been removed to better expose the return mechanism. In this view, the absent control arms are at the outermost position in their arc of movement in order to place the return mechanism in the position illustrated.

The return mechanism includes a pair of latches 202 and 204 which cooperate with corresponding pairs of latch release pawls 206 and 208 and tapered latch pins 210 and 212. Latches 202 and 204 are confined to planar arcuate movement by washer-backed pins 214 which are mounted to the rear of pedestal 28. The latches are joined by a helical return spring 216 which extends between the foot 218 of latch 202 and the foot 220 of latch 204. This spring biases the latches against latch pins 210 and 212 at pin engagement notches 222 and 224.

Figure 10:
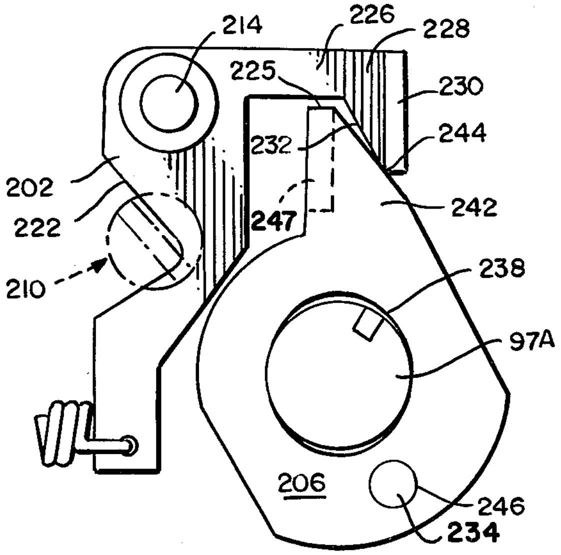
FIG. 10 is an enlarged view of a latch and latch release pawl of the automatic return mechanism.

The configuration of the latches, which may be best understood from an examination of FIG. 10 include laterally extending dogs 226 which cooperate with the latch release pawls in a manner which will be described below. Dogs 226 include downwardly directed fingers 228 with beveled forward edges 230 and inside cam surfaces 232.

The latch release pawls are slidably mounted on slotted shafts 97A and 97B. Gears such as gear 96A of FIG. 9E are key mounted on each of these shafts, spaced to the rear of the latch release pawls.

Each of the latch release pawls is coupled to its adjacent gear by a pin 234 which is fixed in the gear and loosely fitted to an aperture 246 in the pawl. This coupling arrangement permits the pawls to tilt in relation to the axis of their respective shafts while moving along an arc corresponding to the arc of movement of their adjacent gears. The tilting freedom of the pawls may be further enhanced without impairing their arcuate confinement by utilizing an oblong aperture 238 in the pawls to mount them to shafts 97A and 97B which have a diameter corresponding to the shorter axis of the apertures. Pawls 206 and 208 are biased in a normally upright position by coil springs 240 and tilted against the bias of these springs within the spacing between the gears and the rearward face of pedestal 28, as illustrated by the phantom depiction 206A of the pawl in FIG. 9E.

The latch release pawls have blades 242 with outer cam surfaces 244 and inner beveled faces 247. Blades 242 are configured and positioned to cooperate with latch dogs 226 in a manner which will be described below.

Figure 11:
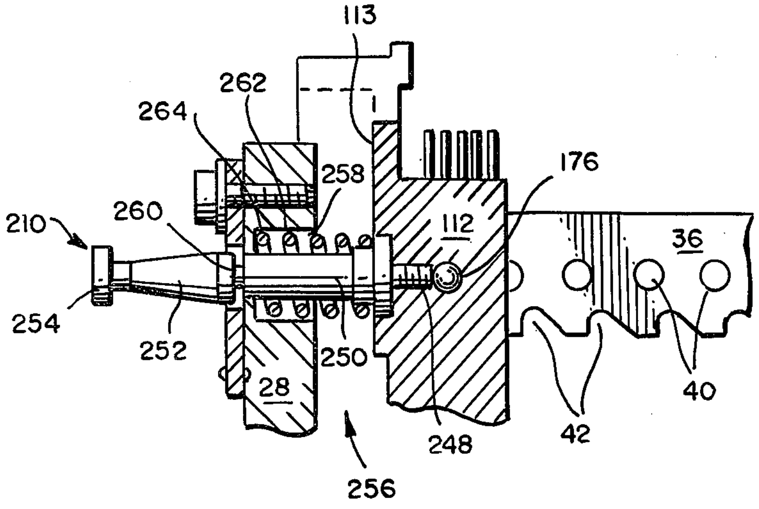
FIG. 11 is a side sectional view of the structure illustrated in FIG. 9 showing the mounting of a latch pin of the automatic return mechanism.

Turning now to FIG. 11, tapered latch pin 210 of the automatic return mechanism is shown in some detail, as mounted to comb frame 112. The pin includes a forward threaded portion 248, by which it is fixed to the comb frame, as well as an intermediate shaft portion 250 and a rearward tapered portion 252 which terminates in a head 254. The pin extends from the comb frame across passage 256 between the punch assemblies and through a bore 258 in pedestal 28 and freely moves through the passage and the bore with the movement of the comb frame between the termination and loading stations. A circumferential slot 260 is located in the pin between the shaft and the rearward tapered portion. A helical spring 262 rests on the pin and is confined in the space between the rearward face 113 of the comb frame and a shoulder 264 in bore 258 to oppose the rearward movement of the comb frame and hence retention means 20.

The operation of automatic return mechanism 200 may best be understood by examining the operation of the latch and latch release pawl of FIGS. 9–9E and the latch pin and spring of FIG. 11. Beginning with FIGS. 9 and 11, the apparatus as shown with the retention means at the termination station, the punch assembly in its termination position and the comb assembly, the control arms, and the gear assembly removed to improve clarity.

In FIG. 9 latch pins 210 and 212 are engaged at the circumferential slot of the latch pins by notches 222 and 224 of the latches. In this position of the apparatus, the pin tapered portions extend rearwardly of the latches into the clearance space between the gear assemblies and helical springs 262, which are compressed along the shaft of the pin, apply a bias against comb assembly 112. As the control arms are operated to retract the punch assemblies, shafts 97A and 97B rotate outwardly carrying latch release pawls 206 and 208 past the positions depicted in FIGS. 9A and 9B to the position shown in FIG. 9C. The latch release pawls are subsequently returned through the position of FIG. 9D to the position of FIG. 9 when the control arms are next operated to move the punch assemblies into their termination position.

It should be noted that latch pins with tapered portions 252 are utilized in the present embodiment in order to permit heads 254 to be made small enough to move through the clearance space of the gear assembly. If the latch pin clearance space in the region of the gear assembly were enlarged, larger headed untapered pins could be used.

Figure 9A:
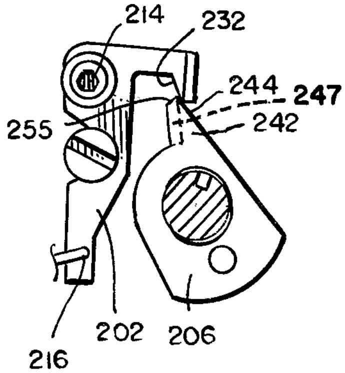
FIGS. 9A–9D are partial end views of the structure illustrated in FIG. 9 showing the sequential movement of a latch and latch release pawl of the automatic return mechanism.
Figure 9B:
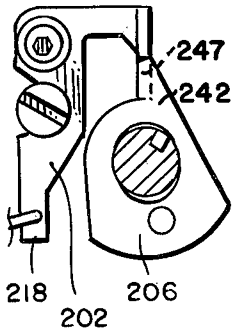

In FIG. 9A the outer cam surface 244 of pawl blade 242 engages inside cam surface 232 of latch 202 to raise latch finger 228 over the tip 255 of the pawl blades. When the latch reaches the position of FIG. 9B, the punch assembly will be fully retracted from the comb assembly. Since latch notches 222 and 224 are disengaged from the pin slots at this point, the comb assembly will be driven forward under the force of springs 262 until pin heads 254 come into abutment with the latches.

This automatic movement of the comb assembly corresponds to the manual movement of the retention means from the termination station to the loading station, as described earlier in connection with the apparatus of FIGS. 1–8. Thus, the carriage is carried forward by the retention means until the dog engages the stop edge of the next notch halting the carriage whereupon while the retention means continues forward until ball detent 176 is indexed into the next roll hole. The indexing of the ball detent corresponds to the range of movement of pins 210 and 212 between heads 254 and circumferential slots 260.

Figure 9C:
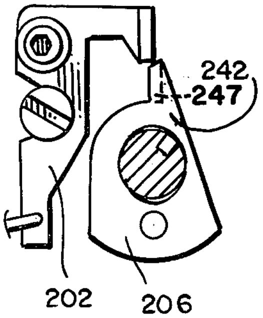
Figure 9D:
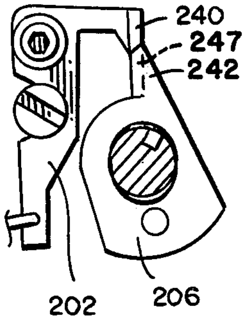
Figure 9E:
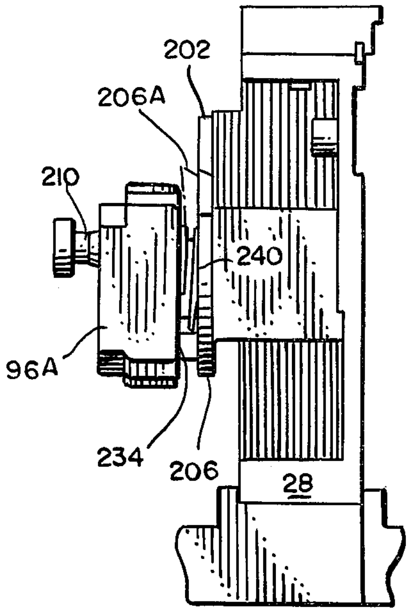
FIG. 9E is a partial side view of the structure illustrated in FIG. 9 in which a gear wheel has been replaced on the shaft supporting the latch release pawl to more thoroughly depict the mounting of the pawl.

Returning to the latch release pawls, the movement of the pawls continues as the control arms are moved through their cycle until the pawl blades clear the latch dogs and the latch returns to its initial position under the urging of return spring 216. This arrangement is shown in FIG. 9C. At this point the next group of conductors are dressed into the comb assembly which is returned to the termination station. The return of the comb assembly sets the automatic return mechanism by moving the latch pins through bores 258 to load spring 262 and place the latch notches in the pin slots.

The control arms are then operated to engage the punch assemblies while inner beveled faces 247 of the latch release pawls engage beveled forward edges 240 of the latch dogs to tilt the pawls against the bias of coil springs 240 so that they may ride over and move past the latch dogs (FIGS. 9D and 9E) to the position depicted in FIG. 9. When termination is complete and the punch assemblies are retracted, the pawls proceed through the earlier described cycle to release the latch pins and automatically return the retention means to the loading station, opposite a new group of unwired contacts.

As explained earlier, under certain conditions of conductor tension and other termination apparatus operating parameters, conductors may pop out of their desired position during the termination operation producing a termination which may fail to satisfy specifications. Although the present apparatus does not generally suffer this problem, an optional wire hold-down was earlier described and depicted in the apparatus of FIGS. 1–8. An alternative and somewhat simpler wire hold-down assembly 300 is now presented in FIGS. 12. 12A and 13.

Wire hold-down assembly 300 requires the replacement of at least one standard punch 134 of each of the punch assemblies with a modified punch 302. These modified punches are mounted in the same manner as the standard punches and include bottom shearing edges 138 corresponding to the bottom shearing edges of the standard punches.

However, the forward edge of each modified punch includes a nose 306 not found in the standard punches which protrudes beyond the forward edge of the punch and extends well above the top edge 308 of the top mounting cut-outs. Nose 306 has a lower bevel 310 which is intended to urge the conductors being terminated downwardly toward the connector in a manner described below.

Pairs of modified punches 302 are mounted in the opposite punch assemblies in lieu of the standard punches. In a preferred five punch assembly arrangement, one pair of modified punches are used, mounted respectively in the second position of one punch assembly and the fourth position of the other assembly. Thus, as the punch assemblies are moved inwardly during the termination operation of the apparatus, opposing punch bevels 310 move across the conductors about to be terminated. This urges the conductors downwardly and confines them in the triangular space 312 between the overlapping punch bevels and the top surface of the connector thereby preventing the conductors from popping out of their desired position during the termination operation.

Although the present apparatus is well suited to the wiring of Bunker Ramo Corporation 57 Series connectors, as noted earlier this apparatus is intended for universal application with multicontact connectors of various different designs. An important consideration therefore arises with respect to the compatibility of the apparatus with the different insulation pierce contact termination structures found in the various popular connector designs.

For example, typical 57 Series contacts require that the conductor be pressed to the very bottom of the contact termination section in order to insure an optimal electrical connection. Other connectors, however, utilize more fragile contacts in which the conductors must not be pressed to the bottom of the termination section lest the contact be damaged and the reliability of the electrical connection placed in jeopardy. Thus, in connectors with contacts of the 57 Series type, the punches must be allowed to move inwardly without restraint until the conductors are properly seated in the bottom of the contact termination sections. Contacts of the more fragile design described above, however, require that the lateral movement of the punches be precisely controlled to insure that the conductors are pressed to the bottom of the contact termination sections.

A lateral stop assembly 320 which permits the present apparatus to accommodate connector contacts of the types discussed above is illustrated in FIGS. 12, 14A and 14B. The stop assembly includes stop elements 322 which have circumferential cut-outs 324 running between first and second radial shoulders 326 and 328. Stop elements 322 also include fingers 330 which protrude beyond the circumference of the stop and have radial lips 332.

Each stop element is mounted to a cover 334 affixed to pedestal 28 by a screw 336 which may be tightened to lock the stop in one of two positions. A pin 338 is fixed to each cover within circumferential cut-out 324 so that the movement of the stop element is confined to an arc between first shoulder 326 and second shoulder 328.

The punch assemblies are provided with tabs 340 which ride along slots 342 in covers 334 as the punch assembly move inwardly to terminate conductors in their respective contacts. When the stop assembly is locked in the position depicted in FIG. 14A, with shoulders 326 abutting pins 338, the tabs move through the slots without interference until the punches have pressed the conductors to the bottom of the contact termination sections. If, however, it is necessary to limit the lateral movement of the punches, screws 336 may be loosened and stop elements 322 moved to the position depicted in FIG. 14B, with shoulder 328 abutting pin 338. When the stop element is in this position, the lateral movement of tab 340 will be precisely confined by lip 332 to the lateral throw necessary to properly terminate the conductors in their corresponding contacts.

While particular embodiments of the invention have been shown and described, it will be obvious to those skilled in the art that changes and modifications may be made therein without departing from the invention in its broader aspects, and therefore, the object of the appended claims is to cover all such changes and modifications which fall within the true spirit and scope of the invention.

What is claimed is:

1. A method for terminating a plurality of conductors to a corresponding plurality of contacts mounted in a connector body comprising the steps of:

A. supporting said connector body at a loading station;

B. aligning retention means with a group of said contacts corresponding to a portion of said connector body and inserting a group of said conductors in said retention means;

C. transporting said corresponding portion of said connector body along with said retention means to a termination station and effecting termination of said group of conductors to said group of contacts; and D. sequentially performing steps B and C on succeeding groups of said conductors and said contacts corresponding to succeeding portions of said connector body until said plurality of conductors has been terminated to said plurality of contacts.

2. A method for terminating a plurality of conductors to a corresponding plurality of contacts mounted in a connector body comprising the steps of:

A. supporting said connector body at a loading station;

B. aligning retention means with a group of said contacts corresponding to a first portion of said connector body;

C. inserting a group of said conductors in said retention means;

D. transporting said corresponding portion of said connector body along with said retention means to a termination station and preparing an automatic return mechanism;

E. effecting termination of said group of conductors to said group or contacts and actuating said automatic return mechanism to automatically align said retention means with a succeeding group of said contacts; and F. sequentially performing steps C, D and E on succeeding groups of said conductors and said contacts corresponding to succeeding portions of said connector body until said plurality of conductors has been terminated to said plurality of contacts.

3. In an apparatus for terminating a plurality of conductors to a corresponding plurality of contacts mounted in a connector body, the apparatus including terminating means for effecting termination of the conductors to the contacts, and means for actuating the terminating means, the improvement comprising:

wire hold-down means which are integral with said terminating means and which move linearly in unison with said actuating means, said wire hold-down means being used for applying a clamping force to said conductors only during termination thereof.

4. The apparatus of claim 3 wherein said clamping force is applied to said conductors at a location adjacent said terminating means.

5. In an apparatus for terminating a plurality of conductors to a corresponding plurality of contacts mounted in a connector body, the apparatus including opposing terminating punch assemblies which move toward each other for effecting termination of the conductors to the contacts, the improvement comprising:

wire hold-down means which are integral with said terminating punch assemblies and which move linearly in unison with said opposing terminating punch assemblies, said wire hold-down means being used for applying a clamping force to said conductors only during termination thereof.

6. The apparatus of claim 5 wherein said wire hold-down means are integral with at least one punch in each opposing terminating punch assembly.

7. The apparatus of claim 6 including means for limiting the movement of said punch assembly relative to said contacts.

8. Apparatus for terminating a plurality of conductors to a corresponding plurality of contacts mounted in a connector body by sequentially terminating groups of said conductors to groups of said contacts, comprising:

a termination station;

terminating means movably mounted on support means at said termination station for effecting termination of a group of said conductors to a group of said contacts;

means attached to said terminating means for actuating said terminating means;

a loading station;

carriage means movably mounted on said support means for transporting said connector body between said loading station and said termination station; and retention means movably mounted on said carriage means and movable between said loading station and said termination station, said retention means being used for receiving said group of conductors at said loading station and for holding said group of conductors in position for termination to said group of contacts at said termination station.

9. The apparatus of claim 8 wherein said retention means and said carriage means traverse equal distances to said termination station and unequal distances to said loading station, said retention means moving an additional distance to align with a succeeding group of said contacts.

10. The apparatus of claim 9 including an indexing means for controlling movement of said carriage means and said retention means, said indexing means permitting said carriage means to move toward said termination station such that succeeding groups of contacts and said retention means are indexed into alignment with said terminating means during succeeding operation, said indexing means further permitting said carriage to move toward said loading station after each termination operation while permitting said retention means to move to said loading station and into alignment with one of said succeeding groups of contacts.

11. The apparatus of claim 10 including a base supporting said carriage means for linear movement between said stations, wherein said actuating means includes a rotatably operable bell crank mechanism for moving said terminating means transversely to the path of said carriage means.

12. The apparatus of claim 11 including wire hold-down means moving linearly in unison with said actuating means to clamp said conductors in position only during termination thereof.

13. Apparatus for terminating a plurality of conductors to a corresponding plurality of contacts mounted in predetermined alignment in a connector body comprising:

a termination station;

terminating means movably mounted on support means at said termination station for effecting termination of said conductors to said contacts;

activating means attached to said terminating means for linearly advancing and retracting said terminating means;

a loading station linearly removed from said termination station for facilitating positioning of said conductors for termination to said contacts;

carriage means movably mounted on said support means for supporting said connector body;

retention means movably mounted on said carriage means for receiving said conductors at said loading station, said retention means being linearly movable between said loading station and said termination station;

return means mounted on said support means for automatically moving said retention means between said loading station and said termination station.

14. The apparatus of claim 13 wherein said return means automatically resiliently return said retention means to said loading station as said terminating means are retracted, after termination of said conductors to said contacts.

15. The apparatus of claim 14 wherein said carriage means are movable between said loading station and said termination station and wherein said return means automatically returns both said retention means and said carriage means to said loading station once termination of said conductors has been effected.

16. The apparatus of claim 15 wherein said retention means retain a group of said conductors for termination to a like group of said contacts and wherein said retention means and said carriage means are moved unequal distances to said loading station by said return means, said retention means moving an additional distance to align with a succeeding group of said contacts.

17. The apparatus of claim 16 wherein said return means include spring means for driving said retention means and said carriage means to said loading station, said spring means being placed in a loaded condition in response to the movement of said retention means to said termination station.

18. The apparatus of claim 17 wherein said spring means are held in said loaded condition by a latch mechanism, said latch mechanism being released in response to the retraction of said terminating means.

19. The apparatus of claim 18 including an indexing means for controlling movement of said carriage means and said retention means, said indexing means permitting said carriage to move toward said loading station after each termination operation while permitting said retention means to move to said loading station and into alignment with the succeeding group of said contacts.

20. Apparatus for terminating a plurality of conductors to a corresponding plurality of contacts mounted in predetermined alignment in a connector body comprising:

- a termination station;
- terminating means movably mounted on support means at said termination station for effecting termination of said conductors to said contacts;
- means attached to said terminating means for actuating said terminating means;
- carriage means movably mounted on said support means for supporting said connector body;
- a loading station removed from said termination station for facilitating manual positioning of said conductors for termination to said contacts; and
- retention means for receiving said conductors at said loading station and for holding said conductors in position;
- said retention means being movable with said carriage means between said loading station and said termination station, and movable with respect to said carriage means for aligning said conductors with the contacts in said connector body to be terminated.

21. The apparatus of claim 20 wherein said retention means and said carriage means are movable in unison between said stations.

22. The apparatus of claim 21 wherein the movements of said retention means and said carriage means are sequenced such that when moving in one direction said retention means and said carriage means traverse the same distance but when moving in the opposite direction said retention means moves a greater distance.

23. The apparatus of claim 22 wherein said distance is determined by the number of said contacts to be terminated, said terminating means including terminating punches corresponding in number to said number of contacts.

24. The apparatus of claim 23 wherein said conductors are loaded in groups and terminated in groups on a repetitive basis.

25. Apparatus for terminating a plurality of conductors to a corresponding plurality of contacts mounted in predetermined alignment in a connector body, comprising:

- a termination station;
- terminating means movably mounted on support means at said termination station for effecting termination of a portion of said conductors to said contacts;
- means attached to said terminating means for actuating said terminating means;
- a loading station removed from said termination station for facilitating manual positioning of said conductors for termination to said contacts;
- carriage means movably mounted on said support means, said carriage means supporting said connector body, and being movable with respect to said terminating means for aligning a portion of said contacts with said terminating means; and
- retention means movably mounted on said carriage means for receiving said conductors at said loading station and for holding said conductors, said retention means being movable between said loading station and said termination station,
- said retention means further being movable with respect to said connector body to align said portion of said conductors with respect to the contacts to be terminated.

26. The apparatus of claim 25 wherein said carriage means are indexible relative to said terminating means for enabling termination of all said contacts.

27. The apparatus of claim 26 wherein said carriage means are sequentially indexible as a function of said retention means movement.

28. The apparatus of claim 27 wherein said retention means retain a group of said conductors, said terminating means include a like group of terminating punches, and wherein said carriage means are indexible to relatively displace said terminating heads and said connector body a distance corresponding to a like group of said contacts.

29. The apparatus of claim 28 wherein said carriage means are movable with said retention means between said stations.

30. The apparatus of claim 29 wherein said carriage means and said retention means are movable in unison between said stations.

31. The apparatus of claim 30 wherein said retention means move independently of said carriage means at said loading station a distance corresponding to said like group of said contacts.

32. The apparatus of claim 31 wherein said terminating means are fixed relative to said termination station and wherein said retention means are moved to occupy the same position in said termination station while moving said carriage means to a different position relative to said terminating means, said different position determined by said distance corresponding to said like groups of said contacts.

33. Apparatus for terminating a plurality of conductors to a corresponding plurality of contacts mounted in predetermined alignment in a connector body, comprising:

a termination station;

terminating means movably mounted on support means at said termination station for effecting termination of said conductors to said contacts;

activating means attached to said terminating means for advancing and retracting said terminating means;

a loading station removed from said termination station for facilitating positioning of said conductors for termination to said contacts;

carriage means movably mounted on said support means, said carriage means supporting said connector body;

retention means movably mounted on said carriage means for receiving said conductors at said loading station, said retention means being movable between said loading station and said termination station; and return means mounted on said support means for automatically moving said retention means between said loading station and said termination station;

said return means automatically returning said retention means to said loading station as said terminating means are retracted, after termination of said conductors to said contacts;

said carriage means being movable between said loading station and said termination station and wherein said return means automatically returns both said retention means and said carriage means to said loading station once termination of said conductors has been effected.

34. The apparatus of claim 33 wherein said retention means retain a group of said conductors for termination to a like group of said contacts and wherein said retention means and said carriage means are moved unequal distances to said loading station by said return means, said retention means moving an additional distance to align with a succeeding group of said contacts.

35. The apparatus of claim 34 wherein said return means include spring means for driving said retention means and said carriage means to said loading station, said spring means being placed in a loaded condition in response to the movement of said retention means to said termination station.

36. The apparatus of claim 35 wherein said spring means are held in said loaded condition by a latch mechanism, said latch mechanism being released in response to the retraction of said terminating means.

37. The apparatus of claim 36 including an indexing means for controlling movement of said carriage means and said retention means, said indexing means permitting said carriage to move toward said loading station after each termination operation while permitting said retention means to move to said loading station and into alignment with the succeeding group of said contacts.

* * * * *